US011205981B2

(12) United States Patent
Ishikawa

(10) Patent No.: US 11,205,981 B2
(45) Date of Patent: Dec. 21, 2021

(54) MOTOR CONTROL DEVICE AND MOTOR CONTROL METHOD, AND OPTICAL DEVICE

(71) Applicant: CANON KABUSHIKI KAISHA, Tokyo (JP)

(72) Inventor: Daisuke Ishikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/892,175

(22) Filed: Jun. 3, 2020

(65) Prior Publication Data
US 2020/0389105 A1 Dec. 10, 2020

(30) Foreign Application Priority Data

Jun. 4, 2019 (JP) .............................. JP2019-104437

(51) Int. Cl.
*H02P 8/18* (2006.01)
*G02B 7/04* (2021.01)

(52) U.S. Cl.
CPC . *H02P 8/18* (2013.01); *G02B 7/04* (2013.01)

(58) Field of Classification Search
CPC ........... G06F 1/022; G06F 1/025; G05B 1/00; G05B 11/107; G05B 19/0426; G05B 2219/1161; G05B 2219/41326; H02P 8/22; H02P 8/40; H02P 25/066; H02P 8/18; H02P 1/00; H02P 1/04; H03M 2201/845
See application file for complete search history.

(56) References Cited

U.S. PATENT DOCUMENTS

| 7,085,200 | B2 * | 8/2006 | Okada ................ G11B 7/08529 |
| | | | 369/30.1 |
| 8,010,019 | B2 * | 8/2011 | Funamoto .......... G03G 15/5008 |
| | | | 399/167 |
| 9,762,159 | B2 | 9/2017 | Mizuo |
| 10,199,964 | B2 | 2/2019 | Mizuo |
| 2009/0102437 | A1 * | 4/2009 | Nakagawa ................ H02P 9/48 |
| | | | 323/217 |

FOREIGN PATENT DOCUMENTS

| JP | 6207223 B2 | 10/2017 |
| JP | 6278622 B2 | 2/2018 |

* cited by examiner

*Primary Examiner* — Antony M Paul
(74) *Attorney, Agent, or Firm* — Cowan, Liebowitz & Latman, P.C.

(57) ABSTRACT

A stepping motor includes a slit rotating plate that rotates together with a rotor and two photo interrupters. A motor control device includes a rotation phase detection unit that acquires an output of the photo interrupter and detects a rotation phase of the rotor, and a drive waveform generation unit that generates a drive waveform of the stepping motor. An advance angle control unit performs speed control of the stepping motor by detecting an advance angle corresponding to a phase difference between the rotation phase of the rotor and the drive waveform and setting an advance angle at which a relationship between an amplitude and an advance angle of the drive waveform changes abruptly as a target advance angle to control an amplitude of the drive waveform.

10 Claims, 13 Drawing Sheets

MAXIMUM EFFICIENCY

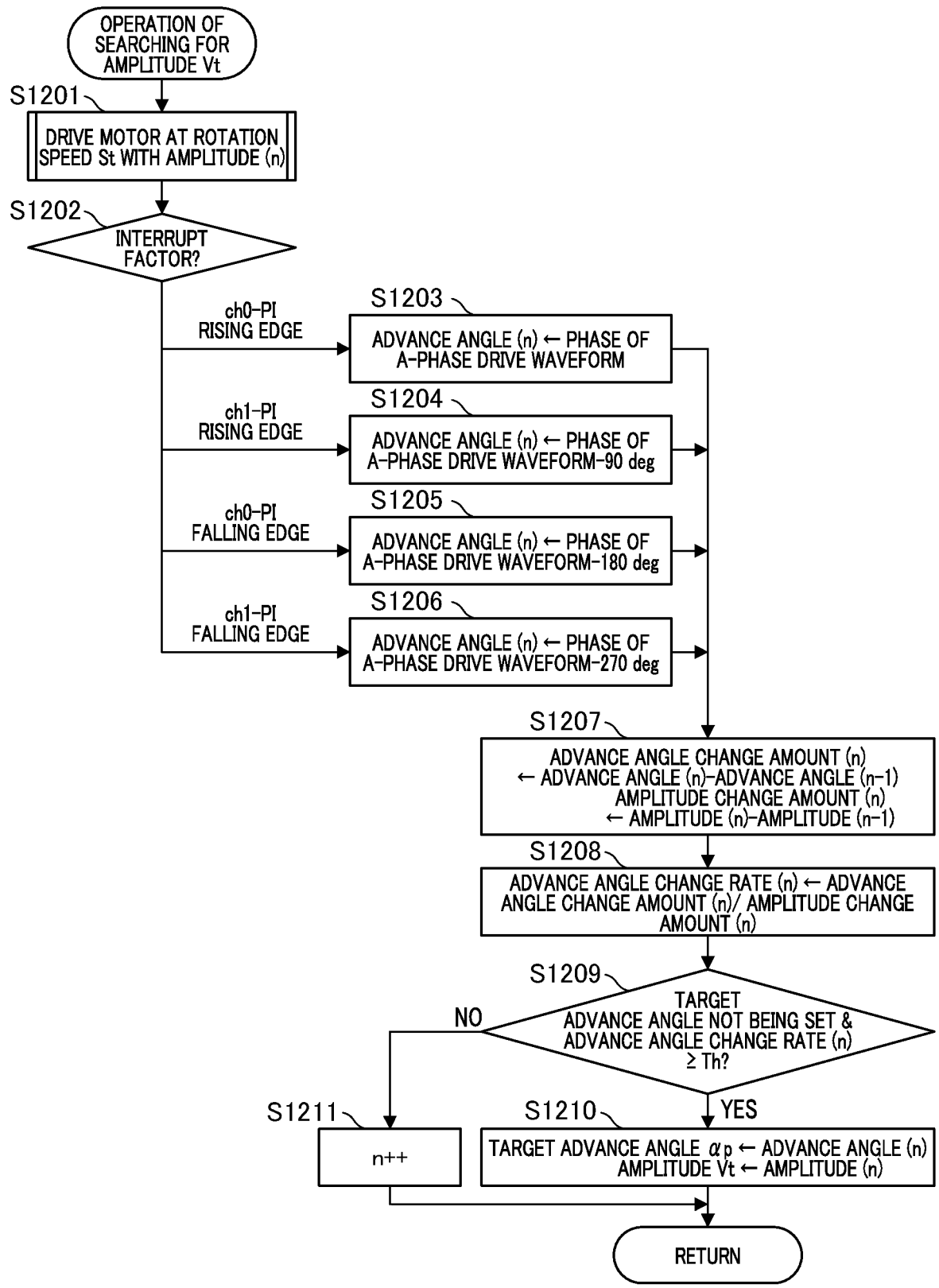

MOTOR CONTROL DEVICE AND MOTOR CONTROL METHOD, AND OPTICAL DEVICE

BACKGROUND OF THE INVENTION

Field of the Invention

The present invention relates to an advance angle control technology of a stepping motor.

Description of the Related Art

Stepping motors used in various fields can easily perform high-precision positioning operations with open-loop control but may lose steps due to a high load or high-speed rotation during the open-loop control. Therefore, there is a method of controlling an advance angle of a drive waveform with respect to a rotation phase using a rotation phase signal of the motor obtained from a position sensor provided in the stepping motor. According to the method, rotation efficiency can be brought to the maximum by an optimum advance angle control, and speeding up and power saving can be realized.

Japanese Patent Publication No. 6278622 discloses a method of changing a cycle of a drive waveform to match an advance angle value to a target value in micro-step driving of a stepping motor. Japanese Patent Publication No. 6207223 discloses a method of changing an amplitude of a drive waveform to match an advance angle value to a target value in micro-step driving of a stepping motor.

In control of a stepping motor, the following issues need to be dealt with.
- If a load variation (heavy/light) of an object to be controlled is large, optimum drive voltages vary with the load.
- Deviation occurs in relationships between a voltage, an advance angle, and a speed due to a change in a load of an object to be controlled over time (deterioration due to sliding wear, grease coming out of a drive unit, or the like) and a change in environmental temperature.

In the conventional technology, it is necessary to determine a margin of a drive voltage in consideration of individual differences (variations) of a motor, a change over time, a change in temperature, or the like and increase the drive voltage more than necessary to prevent the motor from losing steps. Therefore, there is a likelihood that power consumption will increase, and vibration and noise will increase.

SUMMARY OF THE INVENTION

The present invention reduces vibration and noise with lower power consumption in drive control of a stepping motor.

A device according to an embodiment of the present invention is a motor control device that performs drive control of a stepping motor and includes a detection unit configured to detect a rotation phase of a rotor of the stepping motor, a generation unit configured to generate a drive waveform which drives the stepping motor, and a control unit configured to control a rotation speed of the stepping motor by calculating a phase difference between the drive waveform and the rotation phase and changing an amplitude of the drive waveform. The control unit controls a phase of the drive waveform with respect to the rotation phase of the rotor according to a target amplitude and a target phase difference of the drive waveform determined from an amount of change in the phase difference with respect to an amount of change in the amplitude when the amplitude of the drive waveform is changed.

Further features of the present invention will become apparent from the following description of exemplary embodiments with reference to the attached drawings.

BRIEF DESCRIPTION OF THE DRAWINGS

FIG. 10 is a flowchart for explaining processing of searching for a target amplitude and a target advance angle.

DESCRIPTION OF THE EMBODIMENTS

Hereinafter, a motor control device according to an embodiment of the present invention will be described in detail with reference to the accompanying drawings. If an optical device or an imaging device has an optical member such as a lens and its driving mechanism, a motor control device is applicable to a system that drives the optical member with a motor.

Figure 1:
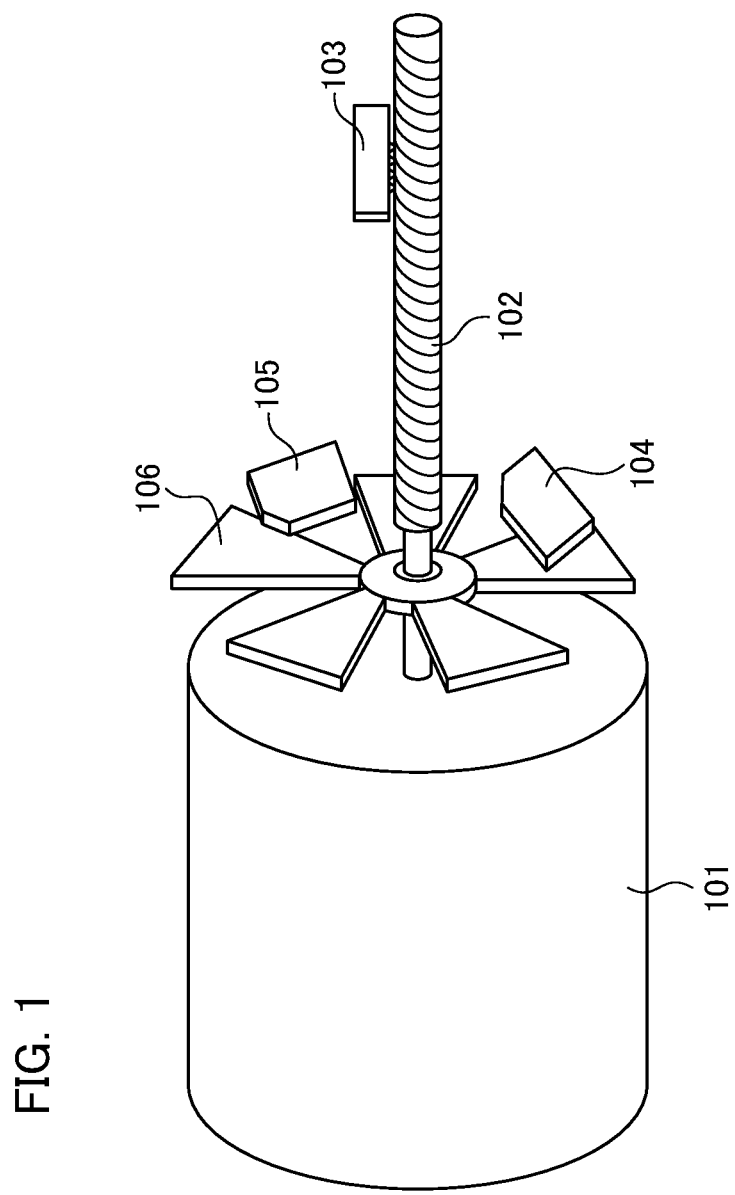
FIG. 1 is a configuration view of a stepping motor unit of an embodiment.

A schematic configuration of a stepping motor unit according to the present embodiment will be described with reference to FIG. 1. A stepping motor (hereinafter, simply referred to as a motor) 101 includes a rotating shaft 102. The rotating shaft 102 of the motor is an advance screw and meshes with a rack 103. In accordance with rotation of the rotating shaft 102, a moving member (not illustrated) connected to the rack 103 moves in an axial direction. Two photo-interrupters 104 and 105 detect rotation of a slit rotating plate 106. Hereinafter, a first photo-interrupter 104 is referred to as ch0-PI, and a second photo-interrupter 105 is referred to as ch1-PI.

The slit rotating plate 106 that rotates together with the rotating shaft 102 includes a plurality of reflection parts and transmission parts having the same width. The number of the reflection parts and the transmission parts is set according to the number of poles of the motor, and, for example, when the number of poles of the motor is 10, a total number of the reflection parts and the transmission parts is set to 10. In the present embodiment, a rotation phase of the stepping motor 101 is detected using the ch0-PI, the ch1-PI, and the slit rotating plate 106.

Figure 2:
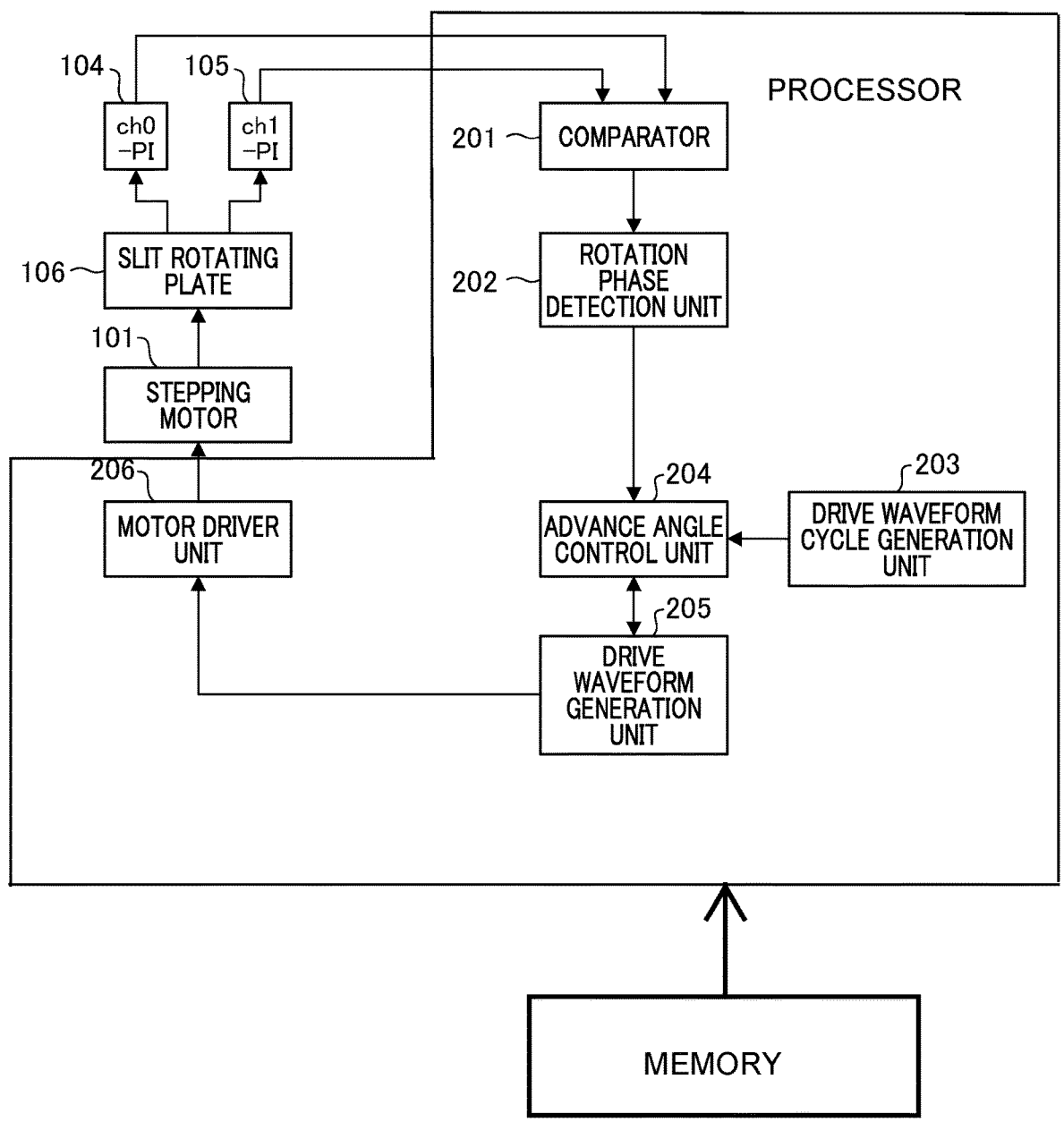
FIG. 2 is a block diagram showing a configuration example of the motor control system of the embodiment.

FIG. 2 is a block diagram showing a configuration example of a motor control system including an electric circuit for drive. A signal detected using the ch0-PI (104), the ch1-PI (105), and the slit rotating plate 106 is input to a comparator 201. The comparator 201 acquires an analog input signal detected by the ch0-PI and an analog input signal detected by the ch1-PI and performs binarization processing.

A rotation phase detection unit 202 detects a rising edge and a falling edge of the signal binarized by the comparator 201, outputs the rotation phase of the stepping motor 101, and outputs an edge detection signal related to an output of the photo-interrupter. The detection signal is called a PI edge detection signal. "PI" is an abbreviation for "photo-interrupter."

A drive waveform cycle generation unit 203 generates cycle information of a drive waveform according to a target moving speed of the moving member that moves due to driving of the motor. The moving member is an optical member such as a movable lens or a diaphragm that constitutes an imaging optical system or a holding member thereof in application to, for example, an imaging device. The drive waveform cycle generation unit 203 outputs the generated cycle information of the drive waveform to an advance angle control unit 204.

The advance angle control unit 204 acquires the PI edge detection signal output from the rotation phase detection unit 202 and performs advance angle control of the motor on the basis of the cycle information of the drive waveform generated by the drive waveform cycle generation unit 203. The advance angle control unit 204 detects a phase difference (that is, an advance angle of the drive waveform) between the rotation phase of the stepping motor 101 output from the rotation phase detection unit 202 and the drive waveform generated by a drive waveform generation unit 205. Further, the advance angle control unit 204 controls an amplitude, a cycle, and an advance angle of the drive waveform generated by the drive waveform generation unit 205 on the basis of the detected advance angle and the cycle information from the drive waveform cycle generation unit 203. Details of processing of the advance angle control unit 204 will be described below.

The drive waveform generation unit 205 generates a sine wave signal based on information output from the advance angle control unit 204 and outputs the sine wave signal to a motor driver unit 206. The motor driver unit 206 generates a motor drive signal according to the sine wave signal from the drive waveform generation unit 205 to drive the stepping motor 101.

Figure 3A:
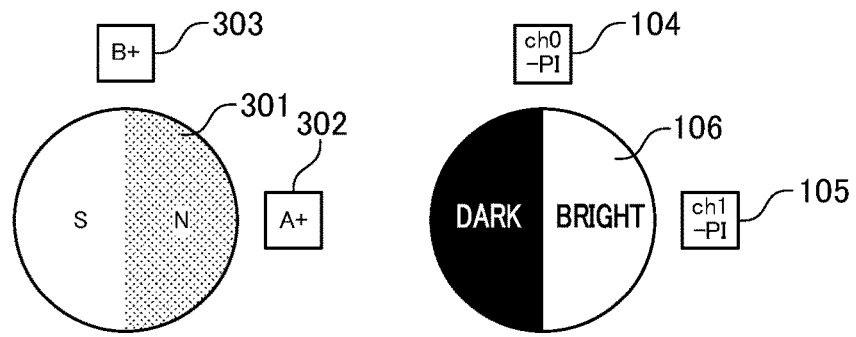
FIGS. 3A to 3C are views representing positional relationships among a rotor magnet, a coil, a slit rotating plate, and a detection unit.
Figure 3B:
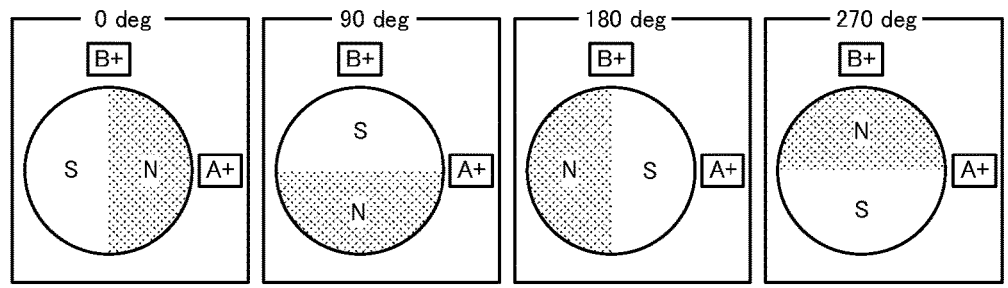
Figure 3C:
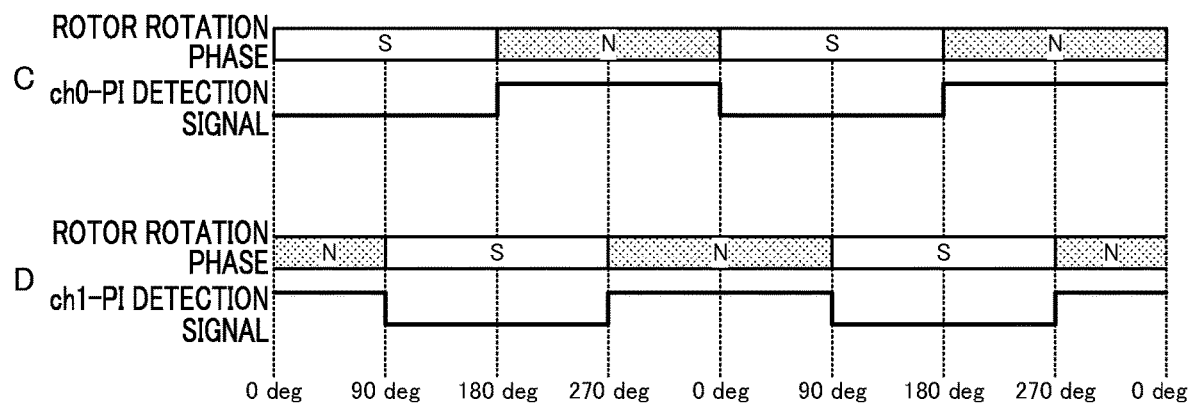

Positional relationships among the rotation phase of the stepping motor 101, the photo-interrupters 104 and 105, and the slit rotating plate 106 will be described with reference to FIGS. 3A to 3C. In FIGS. 3A to 3C, an example in which the number of motor poles is simplified to two is shown so that the description can be more easily understood.

FIG. 3A illustrates a rotor magnet 301 of the stepping motor 101, an A+ phase excitation coil 302, and a B+ phase excitation coil 303. The excitation coils 302 and 303 are disposed at positions shifted by 90 electrical degrees from each other. Further, illustration and description of excitation coils of the phase-A and phase-B are omitted.

On the slit rotating plate 106 in FIG. 3A, the reflection part (dark part) and the transmission part (bright part) thereof are represented. The ch0-PI (104) and the ch1-PI (105) are both shown with respect to the slit rotating plate 106. Disposition is made such that phases of an N pole of the rotor magnet 301 and the bright part of the slit rotating plate 106 match, and phases of an S pole of the rotor magnet 301 and the dark part of the slit rotating plate 106 match. Also, the ch0-PI (104) is disposed at a position corresponding to a phase shifted by 90 degrees from the A+ phase excitation coil, and the ch1-PI (105) is disposed at a position corresponding to a phase shifted by 90 degrees from the B+ phase excitation coil.

FIG. 3B is a schematic view illustrating a state corresponding to a rotation angle of the rotor magnet 301. Four states corresponding to rotation angles of 0, 90, 180, and 270 degrees are shown. In FIG. 3C, a rotation phase of the rotor magnet 301 with respect to a position of the ch0-PI (104) is represented as S pole/N pole, and a change in a detection signal of the ch0-PI is shown. In FIG. 3D, a rotation phase of the rotor magnet 301 with respect to a position of the ch1-PI (105) is represented as S pole/N pole, and a change in a detection signal of the ch1-PI is shown.

Figure 4A:
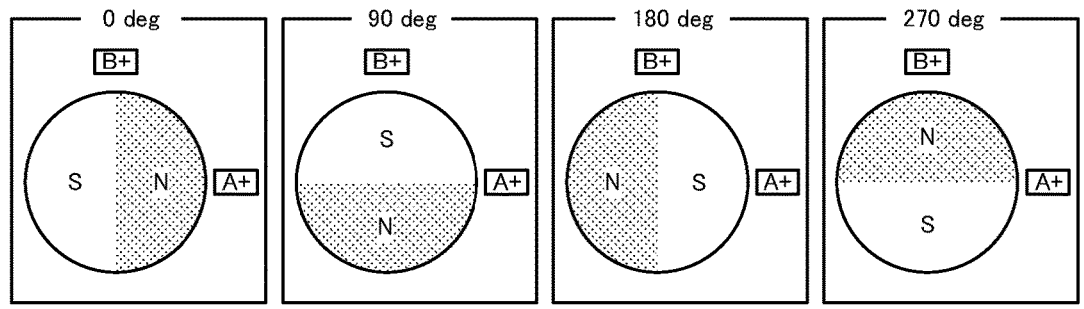
FIGS. 4A and 4B are views representing a relationship between a rotor rotation phase and a drive waveform when there is no follow-up delay of the rotor.
Figure 4B:
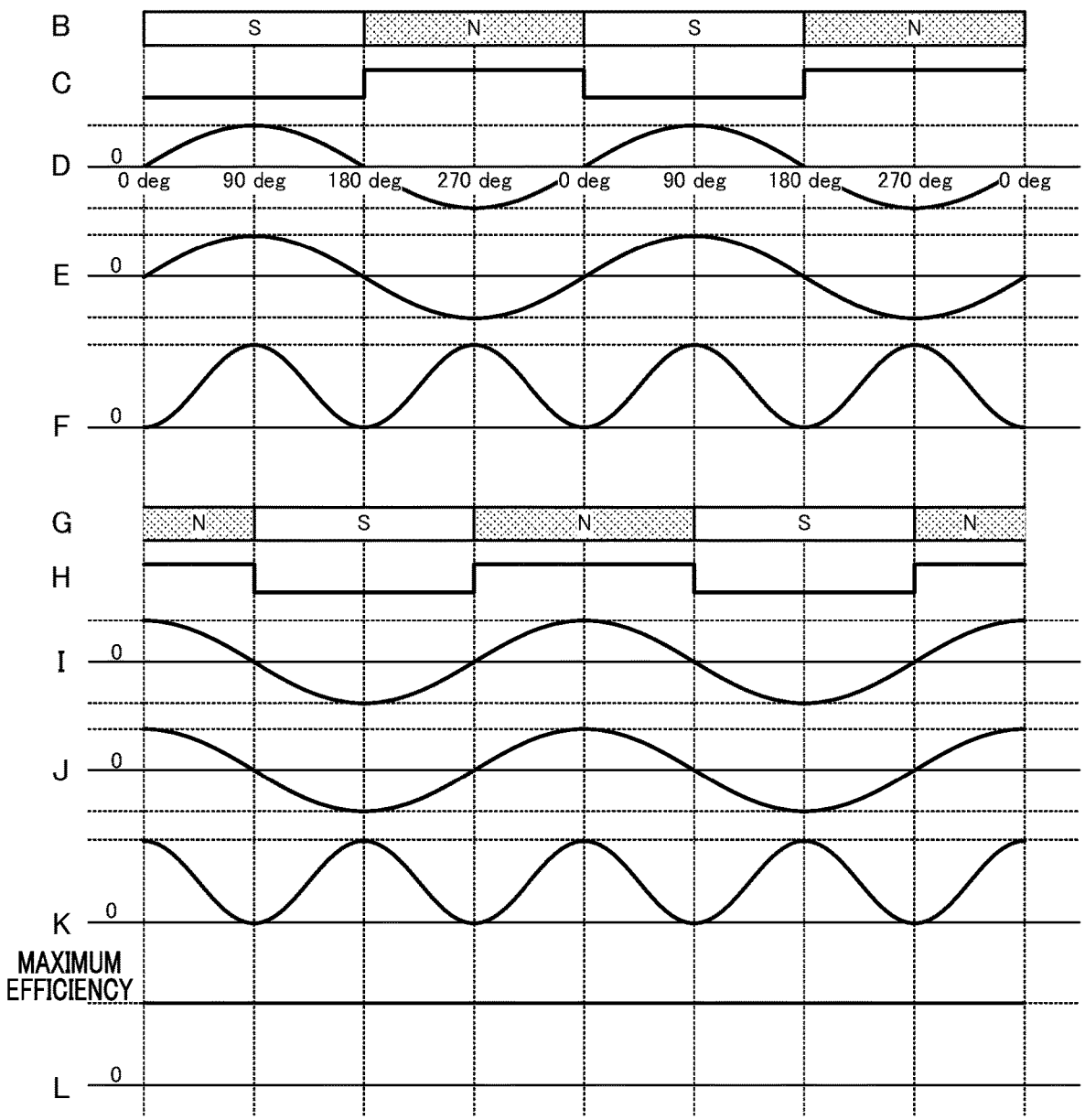

The advance angle control in the present embodiment will be described with reference to FIGS. 4A to 6B. FIGS. 4A and 4B are views showing a relationship between a rotor rotation phase and a drive waveform when there is no follow-up delay of the rotor magnet 301. Hereinafter, as a rotation direction of the motor, a direction in which the rotor magnet 301 shown in each figure rotates clockwise is defined as a normal rotation direction, and a direction of anticlockwise rotation is defined as a reverse rotation direction.

FIG. 4A shows a positional relationship between the rotor and the excitation coil in normal rotation of the rotor magnet 301 and is a view corresponding to FIG. 3B. Four states corresponding to 0, 90, 180, and 270 degrees are shown as rotation angles of the rotor magnet 301. FIG. 4B shows a rotation phase of S pole/N pole of the rotor magnet 301 at each rotation angle when viewed from a position of the ch0-PI (104). FIG. 4C shows a change in a detection signal of the ch0-PI (104).

FIG. 4D shows a magnitude of torque in a rotation direction at a position of the A+ phase excitation coil 302. If the A+ phase excitation coil 302 is excited to an N pole, a torque value that gives a torque in a positive direction to the rotor magnet 301 is defined as a positive value. When the rotation angle is 90 degrees, a maximum torque in the positive direction is generated, and when the rotation angle is 270 degrees, a maximum torque in a negative direction is generated. Further, if the rotation angles are 0 degrees and 180 degrees, the rotor magnet 301 and the A+ phase excitation coil 302 repel or attract each other, and a torque in the rotation direction is not generated.

FIG. 4E shows a drive waveform of the A+ phase excitation coil 302 with respect to the rotation angle of the rotor magnet 301, and a + side shows an excitation state of the N pole. Setting of the horizontal axis is the same as that of FIG. 4D. When the rotation angle of the rotor magnet 301 is 90 degrees, it is in a state of maximum excitation (N pole) on the + side, and when the rotation angle is 270 degrees, it is in a state of maximum excitation (S pole) on a – side. A phase of the excitation waveform is determined so that there is no excitation when the rotation angles are 0 degrees and 180 degrees. FIG. 4F shows a change in torque in a rotation direction obtained due to excitation of the drive waveform in FIG. 4E. Setting of the horizontal axis is the same as that of FIG. 4D.

FIG. 4G shows a rotation phase of S pole/N pole of the rotor magnet 301 at each rotation angle of the rotor magnet 301 when viewed from a position of the ch1-PI (105). FIG. 4H indicates a detection signal of the ch1-PI (105). FIG. 4I shows a magnitude of torque in the rotation direction at a position of the B+ phase excitation coil 303. Setting of the horizontal axis is the same as that of FIG. 4D. If the B+ phase excitation coil 303 is excited to the N pole, a torque value that gives a torque in a positive direction to the rotor magnet 301 is defined as a positive value. When the rotation angle is 0 degrees, a maximum torque in the positive direction is generated, and when the rotation angle is 180 degrees, a maximum torque in the negative direction is generated. Further, if the rotation angles are 90 degrees and 270 degrees, the rotor magnet 301 and the B+ phase excitation coil 303 repel or attract each other, and a torque in the rotation direction is not generated.

FIG. 4J shows a drive waveform of the B+ phase excitation coil 303 with respect to the rotation angle of the rotor magnet 301, and a + side shows an excitation state of the N pole. Setting of the horizontal axis is the same as that of FIG. 4D. When the rotation angle of the rotor magnet 301 is 0 degrees, it is in a state of maximum excitation (N pole) on the + side, and when the rotation angle is 180 degrees, it is in a state of maximum excitation (S pole) on a − side. A phase of the excitation waveform is determined so that there is no excitation when the rotation angles are 90 degrees and 270 degrees. FIG. 4K shows a change in torque in the rotation direction obtained due to excitation of the drive waveform in FIG. 4J. Setting of the horizontal axis is the same as that of FIG. 4D.

FIG. 4L shows a combined torque. A combined torque obtained by combining the torque generated in phase-A (see FIG. 4F) and the torque generated in phase-B (see FIG. 4K) is a torque of the stepping motor 101. When the phase of the drive waveform is aligned with the rotation angle of the rotor magnet 301, a torque at the maximum efficiency can be obtained.

Figure 5A:
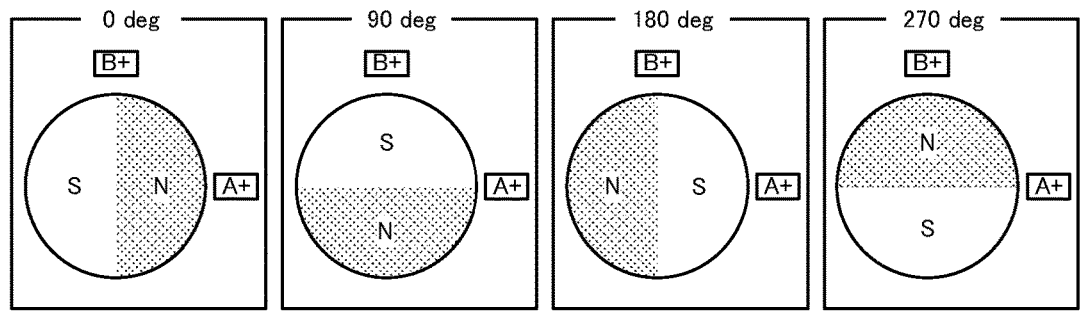
FIGS. 5A and 5B are views representing a relationship between a rotor rotation phase and a drive waveform in a state in which a follow-up delay of the rotor occurs.
Figure 5B:
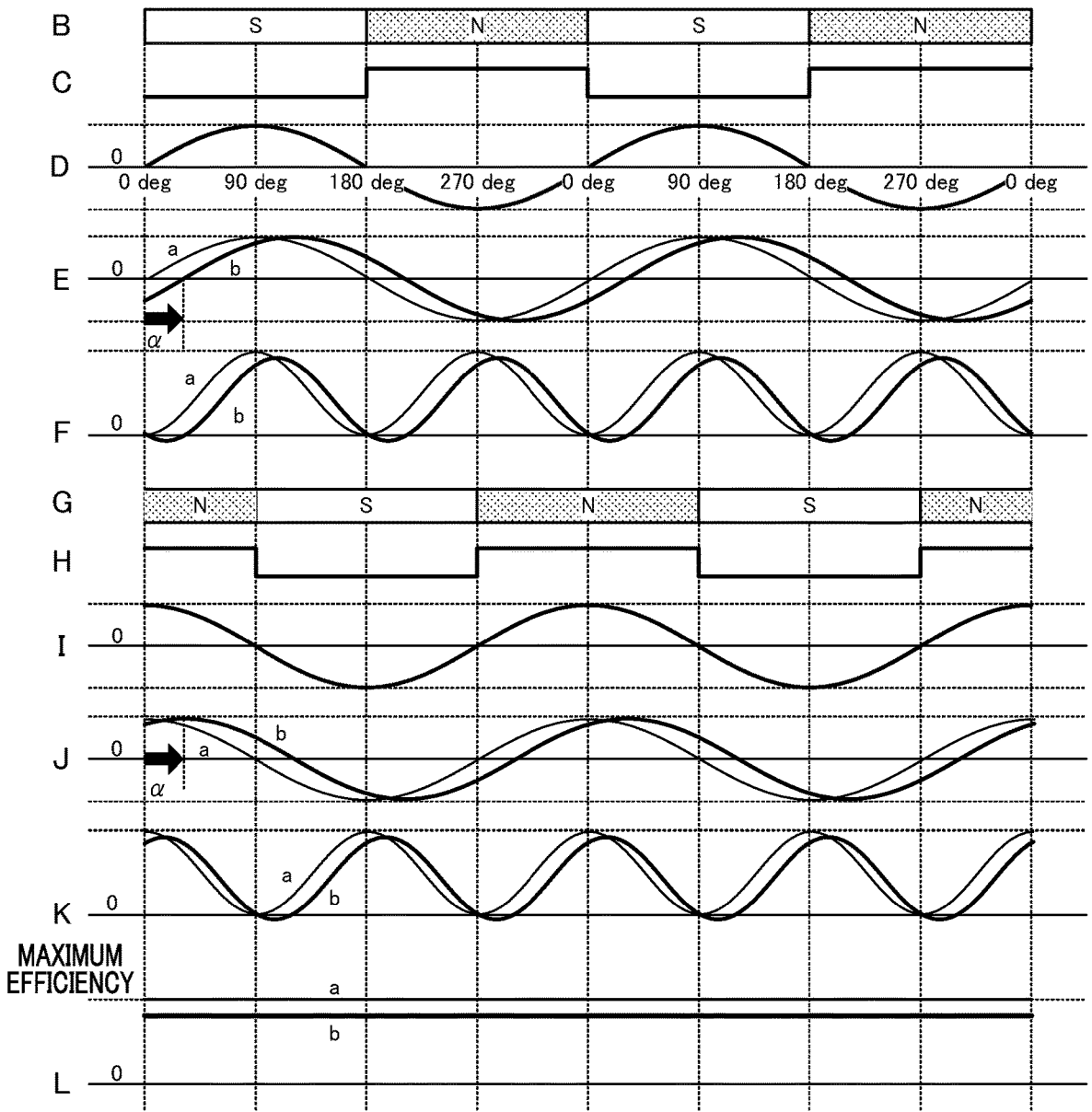

The above description has been made on the assumption that there is no follow-up delay of the rotor magnet 301 with respect to the drive waveforms of the A+ excitation coil 302 and the B+ phase excitation coil 303, or the delay can be ignored. However, since a counter-electromotive force is generated in the motor in a rotating state, a phase lag occurs in the drive waveform that is actually supplied to the excitation coil. FIGS. 5A and 5B show a relationship between a rotor rotation phase and a drive waveform in a state in which a follow-up delay of the rotor magnet 301 occurs due to a phase shift. Since FIGS. 5A and 5B correspond to FIGS. 4A and 4B, respectively, differences therebetween will be described, and description of FIGS. 5B, 5C, 5D, 5G, 5H, and 5I will be omitted.

In FIG. 5E, a waveform a indicates an output waveform of the motor driver unit 206 with respect to the A+ phase excitation coil 302, and a waveform b indicates a drive waveform actually supplied to the A+ phase excitation coil. The waveform b has a delay of phase α generated with respect to the waveform a. In FIG. 5F, a waveform a represents a change in torque corresponding to the waveform a of FIG. 5E, and a waveform b represents a change in torque corresponding to the waveform b of FIG. 5E.

Also, in FIG. 5J, a waveform a indicates an output waveform of the motor driver unit 206 with respect to the B+ phase excitation coil 303, and a waveform b indicates a drive waveform actually supplied to the B+ phase excitation coil. The waveform b has a delay of phase α generated with respect to the waveform a. In FIG. 5K, a waveform a represents a change in torque corresponding to the waveform a of FIG. 5J, and a waveform b represents a change in torque corresponding to the waveform b of FIG. 5J.

As shown in FIGS. 5F and 5K, a torque in the rotation direction due to the A+ phase excitation coil 302 and the B+ phase excitation coil 303 is in a state of the waveform b. As shown in FIG. 5L, a combined torque of the phase-A and the phase-B is not in a state of the waveform a, having the maximum efficiency, but is in a state of the waveform b. That is, a torque state in which efficiency is lowered from the state of the waveform a is obtained.

As described above, a decrease in torque efficiency occurs due to the phase shift of the drive waveform, but in the present embodiment, control of the torque is performed by advancing the phase of the drive waveform by an amount of the phase shift. Hereinafter, processing of the advance angle control will be described.

Figure 6A:
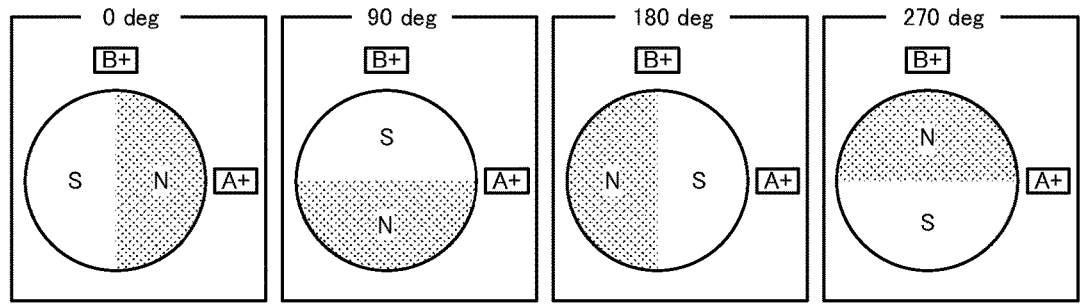
FIGS. 6A and 6B are explanatory views of processing of correcting a decrease in torque efficiency due to a phase shift using advance angle control.
Figure 6B:
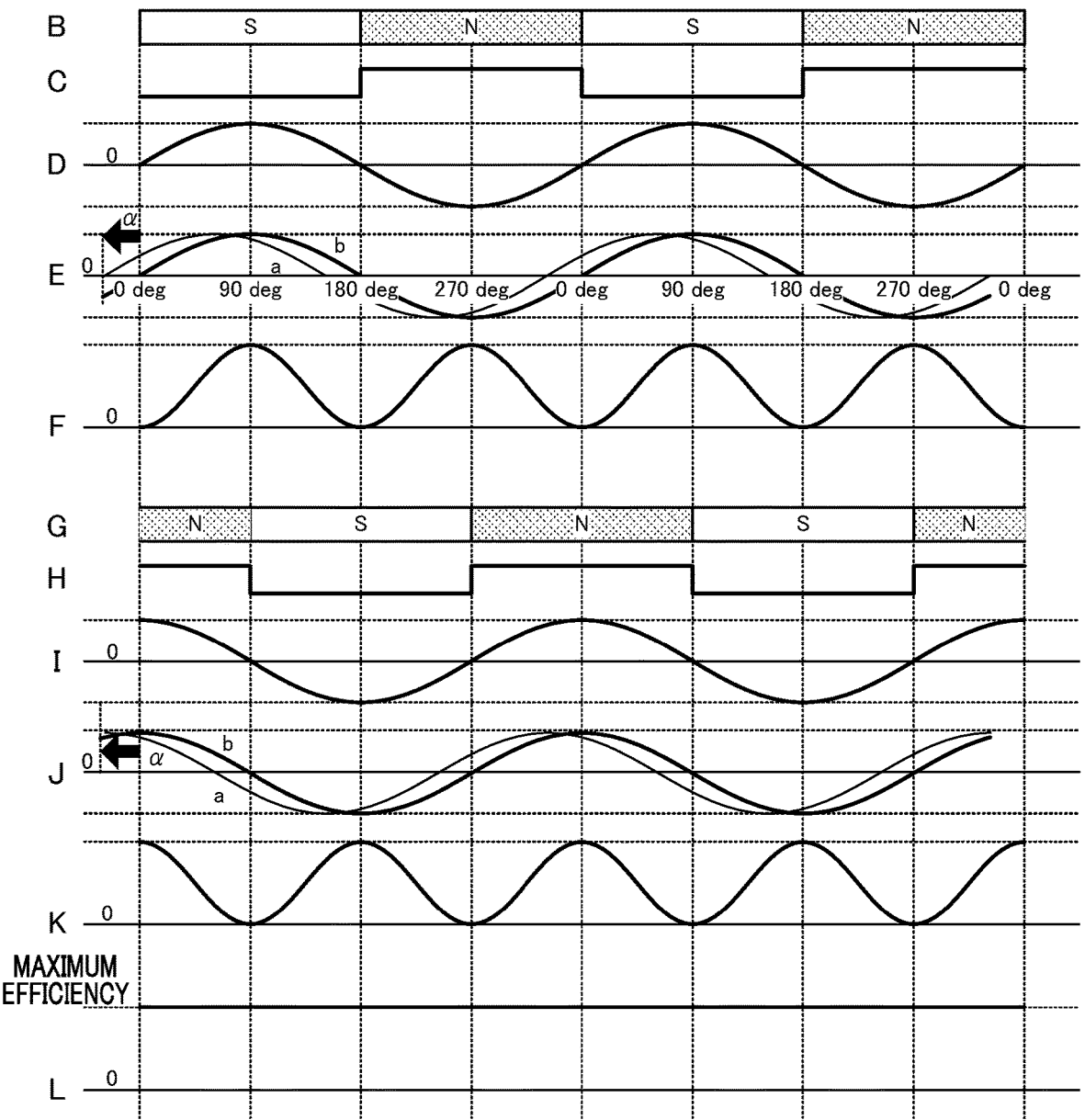

FIGS. 6A and 6B are explanatory views of processing in which correction is performed with respect to a decrease in torque efficiency due to the phase shift described in FIGS. 5A and 5B by the advance angle control. Only differences from FIGS. 4A, 4B, 5A, and 5B will be described, and descriptions of FIGS. 6B to 6D and FIGS. 6G to 6I will be omitted.

In FIG. 6E, a waveform a indicates an output waveform of the motor driver unit 206 with respect to the A+ phase excitation coil 302, and a waveform b indicates a drive waveform actually supplied to the A+ phase excitation coil 302. Control of advancing the output waveform of the motor driver unit 206 with respect to the A+ phase excitation coil 302 by the phase α is performed. The drive waveform actually supplied to the A+ phase excitation coil 302 is the waveform b, which can be matched to a phase of the rotor magnetic force. That is, the phase of the waveform b of FIG. 6E matches the waveform indicated in FIG. 6D.

In FIG. 6J, a waveform a indicates an output waveform of the motor driver unit 206 with respect to the B+ phase excitation coil 303, and a waveform b indicates a drive waveform actually supplied to the B+ phase excitation coil 303. Control of advancing the output waveform of the motor driver unit 206 with respect to the B+ phase excitation coil 303 by the phase α is performed. The drive waveform actually supplied to the B+ phase excitation coil 303 is the waveform b, which can be matched to a phase of the rotor magnetic force. That is, the phase of the waveform b of FIG. 6J matches the waveform indicated in FIG. 6I.

FIG. 6F shows a change in torque in the rotation direction due to the A+ phase excitation coil, and FIG. 6K shows a change in torque in the rotation direction due to the B+ phase excitation coil. With a combined torque of the phase-A and the phase-B, a torque at the maximum efficiency can be obtained as shown in FIG. 6L. That is, control of the torque is possible by controlling the phase (advance angle) of the drive waveform output from the motor driver unit 206.

A cycle (denoted by T) of the drive waveform can be converted into a rotation speed (denoted by S) of the rotor by the following (Expression 1).

$$S = M/T \qquad \text{(Expression 1)}$$

A coefficient M in (Expression 1) is a constant that varies according to the number of poles of the stepping motor.

Next, a method of advance angle control will be described with reference to FIGS. 7 and 8. As the method of advance angle control, there are a cycle control method in which an advance angle is controlled by changing a cycle of a drive waveform, and an amplitude control method in which an advance angle is controlled by changing an amplitude of a drive waveform.

Figure 7:
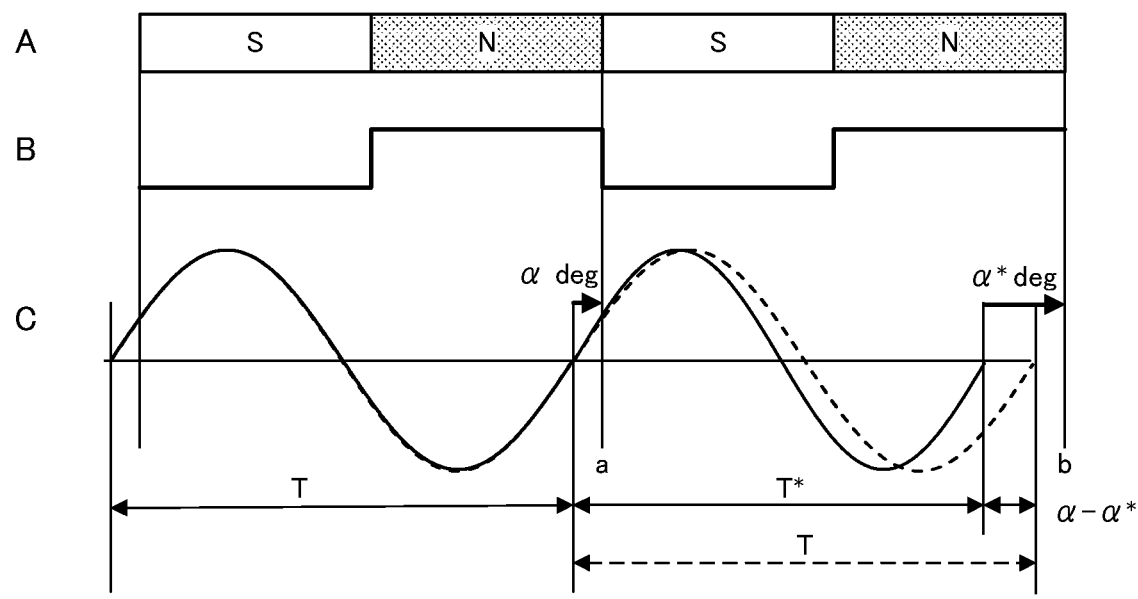
FIG. 7 is a view for explaining an operation of a cycle control method of a drive waveform.

FIG. 7 is a view for explaining an operation of the cycle control method of the drive waveform. FIG. 7A shows a rotation phase of the rotor magnet 301 from a position of the ch0-PI (104). FIG. 7B shows an output waveform of the ch0-PI at that time, and FIG. 7C shows a motor drive signal of the phase-A. Further, description will be made with respect to the ch0-PI, but the same relationship applies also to the ch1-PI (105). In this case, FIG. 7A shows a rotation phase of the rotor magnet 301 from a position of the ch1-PI (105). FIG. 7B shows an output waveform of the ch1-PI at that time, and FIG. 7C shows a motor drive signal of the phase-B. In FIG. 7C, a waveform indicated by a dashed line is a waveform in which pulling of the advance angle has not been performed, and a waveform indicated by a solid line is a waveform when the advance angle has been pulled.

A timing a indicated in FIG. 7 is a timing corresponding to a boundary between an N pole and an S pole of the rotor magnet 301, and the next timing is indicated at b. It is assumed that the advance angle control unit 204 has detected α (degrees) as an advance angle at the timing a. A cycle of a current drive waveform is denoted by T. If a target advance angle −α*(degrees) corresponding to a target phase difference is set, the advance angle control unit 204 calculates a cycle (denoted by T*) corrected by "α−α*" from the cycle T of the current drive waveform. That is, the relationship is "T*=T−(α−α*)." The cycle of the drive waveform before correction (dashed line) is T, and the cycle of the drive waveform after correction (solid line) is T*. The advance angle control unit 204 outputs the corrected cycle T* to the drive waveform generation unit 205 as cycle information. When the cycle of the drive waveform is changed from T to T*, the advance angle of the drive waveform is controlled to the target advance angle α* at the timing b.

Figure 8:
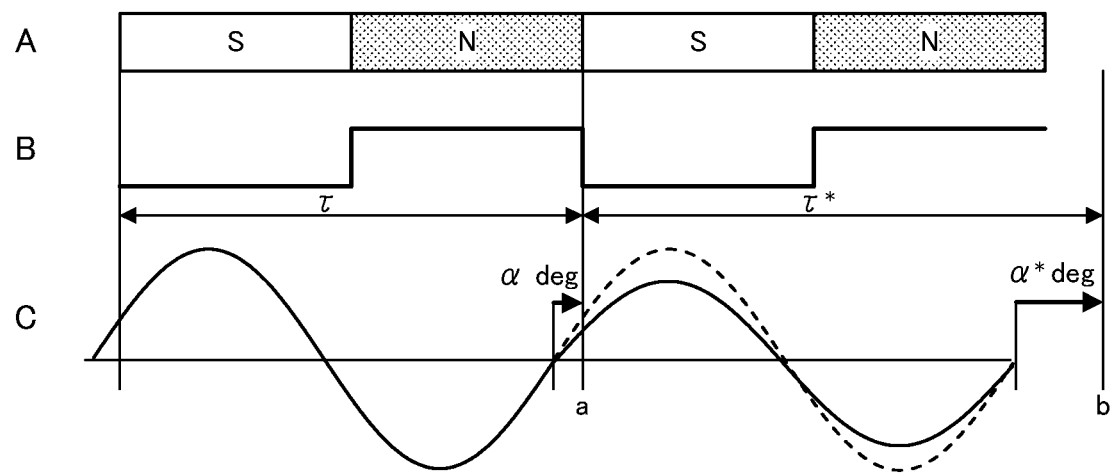
FIG. 8 is a view for explaining an operation of an amplitude control method of a drive waveform.

FIG. 8 is a view for explaining an operation of the amplitude control method of the drive waveform. As in FIG. 7, FIGS. 8A to 8C show a rotation phase of the rotor magnet 301, an output waveform of the ch0-PI, and a motor drive control signal, respectively. It is assumed that the advance angle control unit 204 has detected a (degrees) as the advance angle at the timing a of FIG. 8. If α*(degrees) is set as a target advance angle corresponding to a target phase difference, the advance angle control unit 204 changes an amplitude of the current drive waveform. That is, the current amplitude m is changed to m*. For example, if the target advance angle α* is made to be larger than the current advance angle α, the amplitude m* is changed to a smaller value than the amplitude m. The amplitude of the drive waveform before the change (dashed line) is m, and the amplitude of the drive waveform after the change (solid line) is m*. When the amplitude is caused to decrease, a delay occurs in following-up of the rotor, and a rotation cycle changes from τ to τ* (τ<τ*). As a result, the advance angle reaches the target advance angle α*. Further, if the target advance angle α* is made to be smaller than the current advance angle α, the amplitude m* is changed to a larger value than the amplitude m, and the control is performed in a direction to reduce the delay in following-up of the rotor.

Figure 9A:
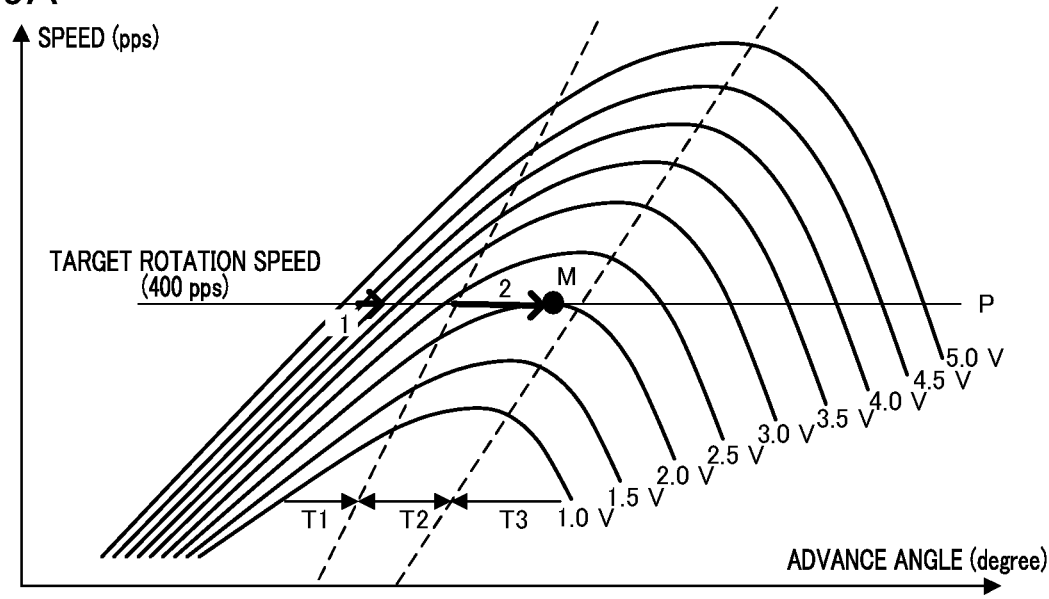
FIGS. 9A to 9C are views for explaining each relationship between an advance angle and a speed, between an amplitude and an advance angle, and between an amplitude and an advance angle change rate.
Figure 9B:
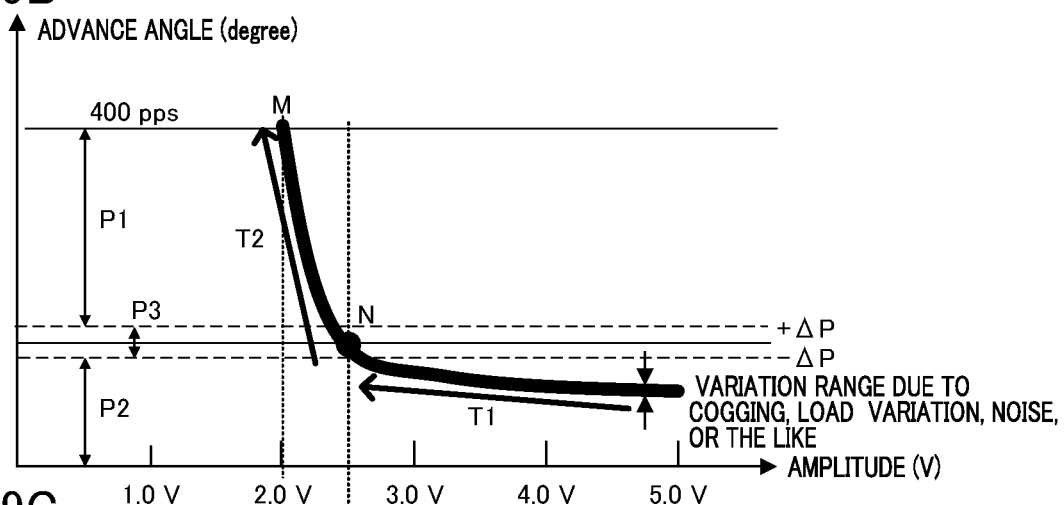
Figure 9C:
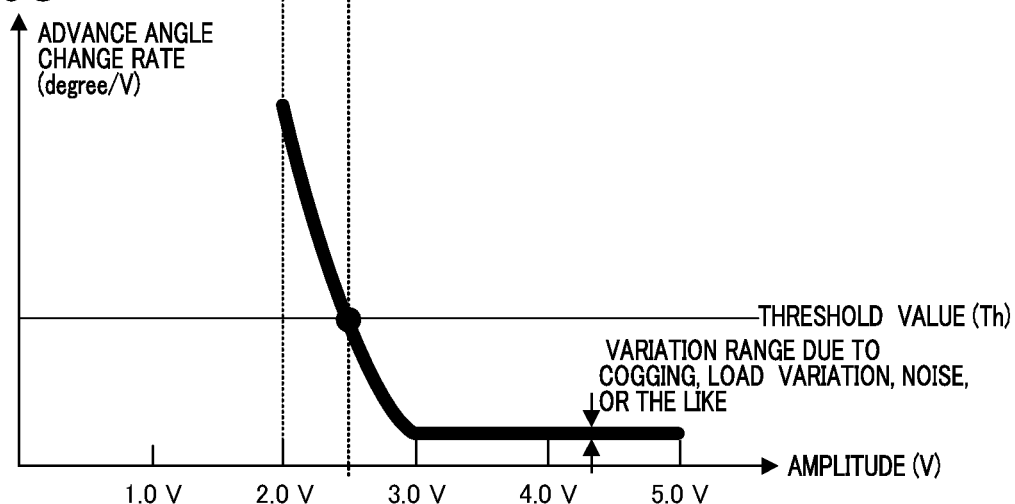

An operation of searching for a target amplitude of the drive waveform will be described using the amplitude control method on the basis of the method of pulling the advance angle in the advance angle control unit 204. FIGS. 9A to 9C are views for explaining each relationship between an advance angle and a speed, between an amplitude and an advance angle, and between an amplitude and an advance angle change rate.

FIG. 9A is a view showing a relationship between an advance angle (unit: degrees) of a drive waveform with respect to a rotation phase of the rotor magnet 301 represented on the horizontal axis and a drivable rotation speed (unit: pulses per second) represented on the vertical axis. Each graph shows an amplitude (unit: volts) of the drive waveform output from the motor driver unit 206 in a range of 1.0 to 5.0 V at intervals of 0.5 V.

A region T1 shown in FIG. 9A is a linear region in which a relationship between the advance angle and the speed is constant when the advance angle is increased from 0 degrees. A region T2 is a region in which an amount of increase in speed is saturated when the advance angle is further increased from the region T1. A region T3 is a region in which the speed rapidly decreases when the advance angle is further increased from the region T2.

Here, a case in which a target rotation speed is set to 400 pps and an amplitude of the drive waveform (also referred to as a drive amplitude) is gradually reduced from its maximum value of 5.0 V is assumed. A line P shown in FIG. 9A corresponds to 400 pps and is a straight line parallel to the horizontal axis. When the drive amplitude is reduced from 5.0 V, the advance angle gradually changes in accordance with a change in the amplitude in the linear region T1 in which the advance angle and the speed have a linear relationship. This is indicated by arrow 1 on the line P in FIG. 9A. This state continues up to around 2.5 V. When the drive amplitude is further reduced, the advance angle reaches the region T2 in which the relationship between the advance angle and the speed is saturated. In the region T2, as indicated by arrow 2 on the line P in FIG. 9A, the change in the advance angle with respect to the change in the drive amplitude increases rapidly, and eventually the advance angle reaches a point at which the speed is saturated (denoted by M). The advance angle can obtain the maximum efficiency at the point M at which the speed is saturated.

FIG. 9B is a view showing a relationship between the amplitude (unit: volts) represented on the horizontal axis and the advance angle (unit: degrees) represented on the vertical axis. FIG. 9B shows the advance angle with respect to the amplitude of the drive waveform along the line P indicating the target rotation speed (400 pps). FIG. 9C is a view showing a relationship between the amplitude (unit: volts) represented on the horizontal axis and an advance angle change rate (unit: degrees/V) represented on the vertical axis. The advance angle change rate indicates a ratio of an amount of change in advance angle to an amount of change in amplitude.

In FIGS. 9B and 9C, when the amplitude is reduced from 5.0 V, the change rate of the advance angle is slight up to about 2.5 V (see the region T1). From 2.5 V to 2.0 V (see the region T2), the change rate of the advance angle rapidly increases. That is, it is ascertained that the advance angle is largely changed by the slight change in the drive amplitude in the region T2. A point N indicated in FIG. 9B corresponds to a position at which an amount of change in the advance angle changes rapidly. When an amount of change in advance angle is detected and an advance angle (denoted by αp) corresponding to the point N at which an amount of change is rapidly increased is set as a target advance angle (target phase difference), the maximum efficiency can be obtained within an error range of 0.5 V or less. For convenience of explanation, the amplitude of the drive waveform has been described at intervals of 0.5 V, but in actual control, control is performed at finer intervals.

Next, processing performed by the advance angle control unit 204 will be described with reference to FIG. 10. FIG. 10 is a flowchart for explaining processing of searching for a target amplitude (denoted by Vt) and the target advance angle αp. The advance angle control unit 204 executes the following processing on the basis of the PI edge detection signal output from the rotation phase detection unit 202. In step S1201, the advance angle control unit 204 sets the amplitude to "amplitude (n)" and starts rotation of the stepping motor 101 at a rotation speed St. The amplitude (n) represents an amplitude value in n-th processing corresponding to an argument n, and an initial value thereof is set in advance. The rotation speed St is a maximum drive speed used for driving the stepping motor.

In step S1202, processing of determining an interrupt factor is executed. The processing branches to steps S1203 to S1206 according to the edge detection factor of the PI edge detection signal. The processing proceeds to step S1203 when a rising edge of the ch0-PI (104) is detected, and the processing proceeds to step S1204 when a rising edge of the ch1-PI (105) is detected. The processing proceeds to step S1205 when a falling edge of the ch0-PI (104) is detected, and the processing proceeds to step S1206 when a falling edge of the ch1-PI (105) is detected. The "advance angle (n)" is detected in the processing of steps S1203 to S1206. The "advance angle (n)" indicates an advance angle value in the n-th processing.

As described with reference to FIGS. 4A and 4B, the relationship between a rotor rotation phase and a drive waveform when there is no follow-up delay of the rotor is as follows.

Phase angle of 0 degrees at rising edge of the ch0-PI (104)
Phase angle of 90 degrees at rising edge of the ch1-PI (105)
Phase angle of 180 degrees at falling edge of the ch0-PI (104)
Phase angle of 270 degrees at falling edge of the ch1-PI (105).

Since the advance angle is a deviation from these phase angles, the current advance angle can be acquired by the processing of steps S1203 to S1206 according to the edge detection factor. For example, in step S1204, a value obtained by subtracting the phase angle of 90 degrees from a phase of the phase-A drive waveform is detected as "advance angle (n)." After the processing of steps S1203 to S1206, the processing proceeds to step S1207.

Processing from steps S1207 to S1211 is processing of searching for the target amplitude Vt and the target advance angle αp in the present embodiment. In step S1207, an "advance angle change amount (n)" of the advance angle generated in a PI edge detection period is calculated from a difference between the "advance angle (n)" detected this time and the "advance angle (n−1)" detected previous time. Further, an "amplitude change amount (n)" of the drive amplitude generated in the PI edge detection period is calculated from a difference between the "amplitude (n)" of the drive waveform set this time and the "amplitude (n−1)" of the drive waveform set previous time. In the next step S1208, an "advance angle change rate (n)" is calculated from a ratio between the calculated advance angle change amount (n) and the amplitude change amount (n) by the following (Expression 2).

$$\text{Advance angle change rate}(n) = \text{advance angle change amount } (n)/\text{amplitude change amount}(n) \quad \text{(Expression 2)}$$

Next, the processing proceeds to step S1209, and, here, it is determined whether or not the target advance angle is not set (360 degrees) and the advance angle change rate is equal to or greater than a threshold value (described by Th). If the target advance angle is not set and the advance angle change rate is equal to or greater than the threshold value, the processing proceeds to step S1210, and if the determination condition is not satisfied, the processing proceeds to step S1211.

In step S1210, processing of setting the "amplitude (n)" at that time as the target amplitude Vt and setting the "advance angle (n)" at that time as the target advance angle αp is performed. On the other hand, in step S1211, increment processing of the argument n is executed so that driving is performed with the amplitude (n) changed to next "amplitude (n)" at the time of next processing. After the processing in steps S1210 and S1211, the processing proceeds to return processing.

When the above processing is repeated, the target amplitude Vt and the target advance angle αp can be eventually searched. Here, setting of the threshold value Th in step S1209 will be further described with reference to FIGS. 9A to 9C. It is ideal that the target advance angle is set to an advance angle value at the point M (see FIG. 9A) at which the speed is saturated. However, as shown in FIG. 9C, the advance angle change rate varies due to an influence of cogging of the stepping motor 101, a variation in load or noise of the drive waveform applied to the stepping motor 101, or the like. A margin based on the variation is necessary to be provided. That is, as the advance angle change amount (n) in (Expression 1), the advance angle change rate (n) calculated when the advance angle variation component based on the above-described factor is set is the advance angle change rate generated due to the above-described factor. Therefore, the advance angle change rate in which the advance angle change rate generated due to the above-described factor is added to the advance angle change rate (n) in the region T1 is set as the threshold value Th.

Figure 11A:
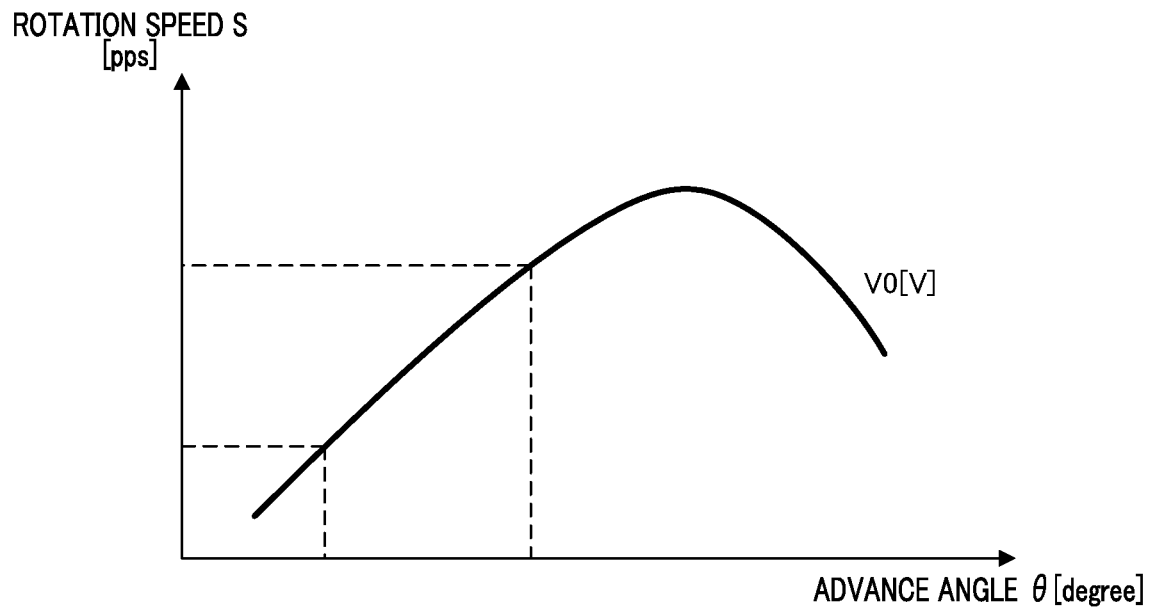
FIGS. 11A and 11B are views representing a relationship between an advance angle and a rotation speed of the rotor.
Figure 11B:
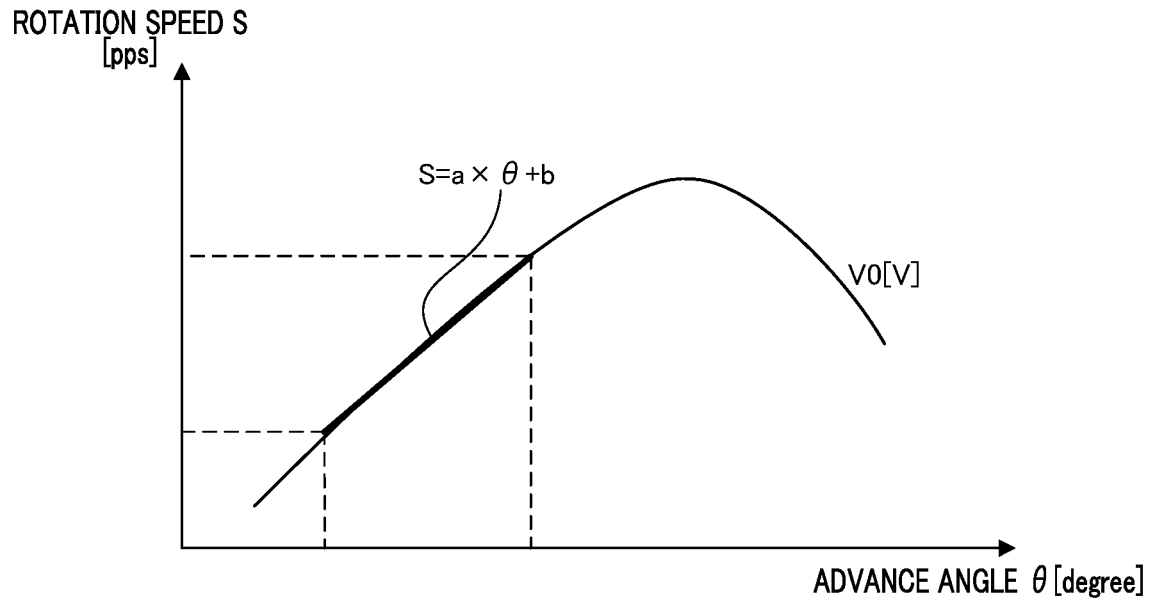

FIGS. 11A and 11B are views representing a relationship between an advance angle (horizontal axis) and a rotation speed of the rotor (vertical axis), and show a relationship between an advance angle θ and a rotation speed S at a predetermined drive voltage V0 in a graph. A trajectory indicating a relationship between the advance angle and the speed on the graph line is hereinafter referred to as an "advance angle-speed characteristic curve." When the advance angle θ decreases as it proceeds to the left on the horizontal axis of the graph in FIGS. 11A and 11B, the rotation speed S decreases. Also, when the advance angle θ increases as it proceeds to the right on the horizontal axis of the graph in FIGS. 11A and 11B, the rotation speed S increases. However, there is a feature that the rotation speed S decreases when the advance angle θ is larger than a predetermined value.

When information indicating the advance angle-speed characteristic curve (advance angle-speed data) is actually measured and tabulated and stored in advance in a storage unit in a control device as reference table data, a target advance angle value can be calculated if an arbitrary speed is designated to drive the motor. However, if the advance angle-speed data is tabulated and stored, there is a likelihood that an amount of data will increase. Therefore, the motor control device of the present embodiment stores the advance angle-speed data in a limited speed range in the storage unit in advance and calculates the target advance angle using the advance angle-speed data. Therefore, an amount of data used for calculating the target advance angle can be reduced.

In the present embodiment, linear approximation of the advance angle-speed data at a predetermined drive voltage V is performed. FIG. 11B is a view for explaining approximation processing for the advance angle-speed characteristic curve, and setting of the horizontal axis and the vertical axis is the same as that of FIG. 11A. A relationship between the rotation speed S and the advance angle θ is formed into a mathematical expression by the following (Expression 3) with a and b as constants.

$$S = a \times \theta + b \qquad \text{(Expression 3)}$$

Specifically, within a range of a controllable drive speed, linear approximation is performed for the advance angle-speed data in a region in which an average change rate in the advance angle-speed characteristic curve is high and linearity is relatively high, and then the calculated data is stored in the memory for each drive voltage. Thereby, an advance angle value of the drive waveform corresponding to the designated rotation speed S can be calculated as the target advance angle on the basis of correspondence information between the advance angle and the rotation speed in a predetermined range of the rotation speed of the rotor, which has been stored in the memory in advance.

Figure 12:
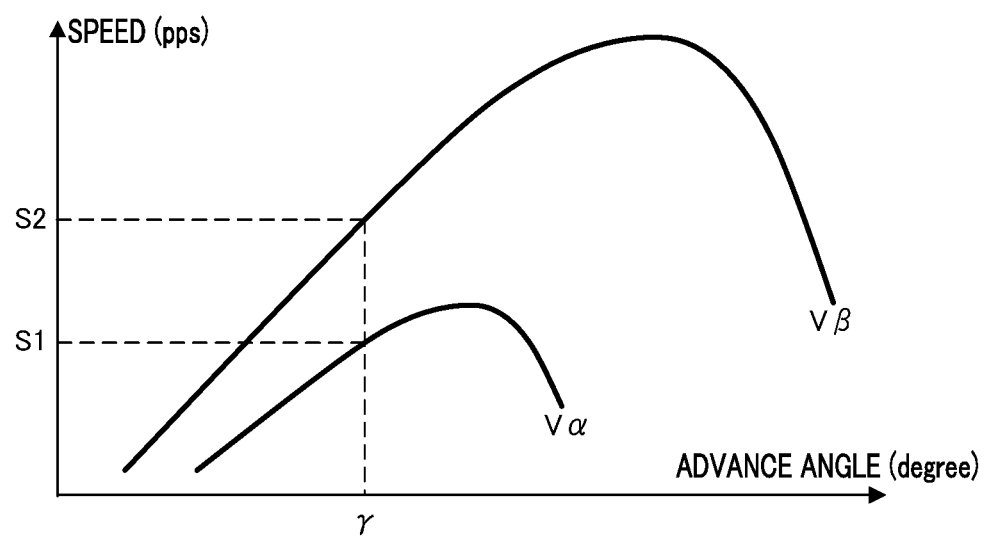
FIG. 12 is a view for explaining a relationship between an advance angle and a speed for each drive voltage.

FIG. 12 is a view for explaining a relationship between an advance angle and a speed for each drive voltage and shows the advance angle-speed data when actually measured at drive voltages Vα and Vβ. In this case, the relationship is "Vα<Vβ." When the advance angle is γ indicated on the horizontal axis in FIG. 12, a rotation speed is S1 at the drive voltage Vα, and a rotation speed is S2 at the drive voltage Vβ. That is, the rotation speed S2 when the higher drive voltage Vβ is applied is higher than the rotation speed S1 when the drive voltage Vα is applied (S1<S2).

Between the advance angle αp at which the maximum efficiency is obtained and the target rotation speed St (maximum rotation speed), the following relationship (Expression 4) is established from (Expression 3).

$$St = a \times \alpha p + b \qquad \text{(Expression 4)}$$

The search operation for the target amplitude Vt is performed during initialization drive processing (reference position detection processing) for determining position coordinates of the stepping motor 101 when power is turned on. Also, the search operation may be performed after a predetermined time has elapsed since the previous search operation for the target amplitude was executed.

From the determined target amplitude Vt, values of a and b, which are coefficients of the relational expression represented by (Expression 3), are set. Hereinafter, a method thereof will be described. The target amplitude Vt determined by the search operation for the drive amplitude of the stepping motor 101 is set. Thereafter, a detection cycle (denoted by Ts) when the stepping motor is driven by the cycle control method using a predetermined advance angle (denoted by β) as the target advance angle is detected. The detection cycle Ts can be detected from a rotation phase of the rotor. The detection cycle Ts is converted into a motor rotation speed Ss by the above-described (Expression 1) (Ss=M/Ts). Thereby, the following relational expression can be obtained.

$$Ss = a \times \beta + b \qquad \text{(Expression 5)}$$

The constants a and b can be obtained by deriving the following (Expression 6) from (Expression 4) and (Expression 5).

$$a = (St - Ss)/(\alpha p - \beta)$$

$$b = (Ss \times \alpha p - St \times \beta)/(\alpha p - \beta) \qquad \text{(Expression 6)}$$

The target advance angle θ can be obtained from the target rotation speed S on the basis of the constants a and b and (Expression 3), and the stepping motor 101 can be efficiently controlled by the cycle control method.

Figure 13:
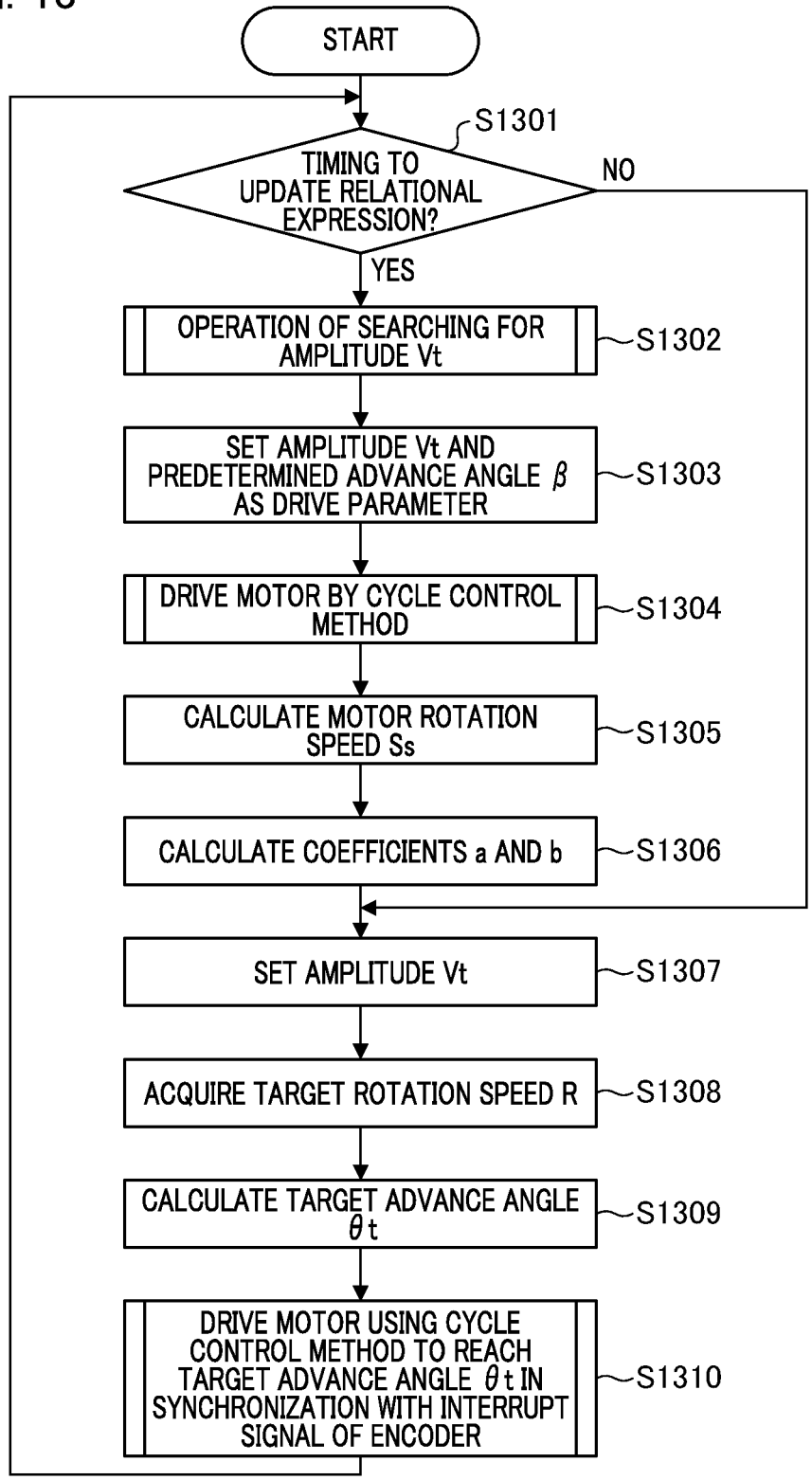
FIG. 13 is a flowchart for explaining processing of calculating a target advance angle.

Next, a calculation processing of the target advance angle performed by the advance angle control unit 204 will be described with reference to a flowchart of FIG. 13. First, in step S1301, determination processing of determining whether or not it is an update timing of the coefficients a and b and the drive amplitude Vt of (Expression 3) described above is executed. If it is determined that the current point of time is the update timing, the processing proceeds to step S1302, and if it is determined that the current point of time is not the update timing, the processing proceeds to step S1307. The determination as to whether or not it is the update timing is performed during the initialization drive processing (reference position detection processing) or the like for determining the position coordinates of the stepping motor 101 when power is turned on. Also, the determination processing may also be performed after a predetermined time has elapsed since the previous search operation for the target amplitude was executed. Also, the determination processing may be performed during a predetermined ending operation performed when power of an object to be controlled is turned off.

In step S1302, the advance angle control unit 204 performs a search operation of the drive amplitude Vt when the motor is rotated at the rotation speed St and calculates the drive amplitude Vt and the advance angle αp at which the maximum efficiency is obtained. In step S1303, the advance angle control unit 204 sets the drive amplitude Vt and a predetermined advance angle β as drive parameters, and in the next step S1304, the stepping motor 101 is driven using the cycle control method. Thereafter, in step S1305, the advance angle control unit 204 calculates the rotation speed Ss of the motor from the detected rotation phase of the rotor.

Next, the processing proceeds to step S1306, in which the advance angle control unit 204 calculates the coefficients a and b from (Expression 6) using the drive amplitude Vt, the rotation speed St, the advance angle αp, the rotation speed Ss, and the predetermined advance angle β. Then, the processing proceeds to step S1307, in which the advance angle control unit 204 sets the drive amplitude Vt, and a target rotation speed R is acquired in step S1308. In step S1309, the advance angle control unit 204 calculates θt by converting the target rotation speed R acquired in step S1308 into a target advance angle θt using (Expression 3). In step S1310, the advance angle control unit 204 drives the motor using the cycle control method to reach the target advance angle θt in synchronization with an interrupt signal of an encoder. Thereafter, the processing returns to step S1301 again, and the processing is repeated.

According to the present embodiment, even when there is an individual difference (variation) in motors and moving members, or a variation in load due to a change over time, temperature change, or the like, since control is performed by searching an optimum advance angle and determining a target advance angle (target phase difference), an efficient drive torque can always be obtained. A vibration and noise of the motor can be reduced with lower power consumption without increasing the drive voltage more than necessary.

OTHER EMBODIMENTS

Embodiment(s) of the present invention can also be realized by a computer of a system or apparatus that reads out and executes computer executable instructions (for example, one or more programs) recorded on a storage medium (which may also be referred to more fully as a "non-transitory computer-readable storage medium") to perform the functions of one or more of the above-described embodiment(s) and/or that includes one or more circuits (for example, application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (for example, central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-104437, filed Jun. 4, 2019, which is hereby incorporated by reference wherein in its entirety.

What is claimed is:

1. A motor control device which performs drive control of a stepping motor comprising:
at least one processor and a memory holding a program which makes the processor function as:
a detection unit configured to detect a rotation phase of a rotor of the stepping motor;
a generation unit configured to generate a drive waveform which drives the stepping motor; and
a control unit configured to control a rotation speed of the stepping motor by calculating a phase difference between the drive waveform and the rotation phase and changing an amplitude of the drive waveform,
wherein the control unit controls a phase of the drive waveform with respect to the rotation phase of the rotor according to a target amplitude and a target phase difference of the drive waveform determined from an amount of change in the phase difference with respect to an amount of change in the amplitude when the amplitude of the drive waveform is changed.

2. The motor control device according to claim 1, wherein the control unit changes the phase of the drive waveform with respect to the rotation phase of the rotor using a relational expression between a rotation speed of the rotor and the phase difference.

3. The motor control device according to claim 2, wherein the control unit sets the amplitude and the phase difference in which an amount of change in the phase difference when an amplitude of the drive waveform is changed at a first rotation speed of the stepping motor satisfies a set condition as the target amplitude and a first target phase difference, sets the phase difference when the stepping motor is driven at a second rotation speed at the target amplitude as a second target phase difference, generates the relational expression from a relationship between the first rotation speed and the first target phase difference and a relationship between the second rotation speed and the second target phase difference, and controls a rotation speed of the stepping motor using the relational expression.

4. The motor control device according to claim 3, wherein the control unit sets the target amplitude, acquires a detection cycle when the stepping motor is driven by a cycle control method of changing a cycle of the drive waveform from the rotation phase of the rotor, and calculates the second rotation speed from the detection cycle.

5. The motor control device according to claim 4, wherein the control unit calculates the target phase difference corresponding to a target rotation speed of the stepping motor.

6. The motor control device according to claim 1, wherein the control unit calculates an amount of change in the phase difference while reducing an amplitude of the drive waveform and determines the amplitude and the phase difference when the amount of change in the phase difference with respect to an amount of change in the amplitude satisfies a predetermined condition as the target amplitude and the target phase difference.

7. The motor control device according to claim 6, wherein the control unit determines, as the predetermined condition, the phase difference when a ratio of the amount of change in the phase difference to the amount of change in the amplitude is equal to or greater than a threshold value as the target phase difference.

8. The motor control device according to claim 7, wherein the control unit sets the threshold value based on the amount of change in the phase difference generated by a variation in rotation due to cogging of the stepping motor or a variation in rotation due to a variation in load or noise of the drive waveform applied to the stepping motor.

9. An optical device comprising:
a motor control device which performs drive control of a stepping motor;
an optical member; and
the stepping motor,
wherein the motor control device comprising at least one processor and a memory holding a program which makes the processor function as:
a detection unit configured to detect a rotation phase of a rotor of the stepping motor;
a generation unit configured to generate a drive waveform which drives the stepping motor; and
a control unit configured to control a rotation speed of the stepping motor by calculating a phase difference between the drive waveform and the rotation phase and changing an amplitude of the drive waveform,
wherein the control unit controls a phase of the drive waveform with respect to the rotation phase of the rotor according to a target amplitude and a target phase difference of the drive waveform determined from an amount of change in the phase difference with respect to an amount of change in the amplitude when the amplitude of the drive waveform is changed, and
wherein the stepping motor controlled by the motor control device moves the optical member.

10. A motor control method executed by a motor control device performing drive control of a stepping motor, the motor control method comprising:

detecting a rotation phase of a rotor of the stepping motor;
generating a drive waveform which drives the stepping motor;
calculating a phase difference between the drive waveform and the rotation phase;
changing an amplitude of the drive waveform; and
controlling a rotation speed of the stepping motor by controlling a phase of the drive waveform with respect to the rotation phase of the rotor according to a target amplitude and a target phase difference of the drive waveform determined from an amount of change in the phase difference with respect to an amount of change in the amplitude.

\* \* \* \* \*